No. 775,311. PATENTED NOV. 22, 1904.
L. S. PFOUTS.
MOTOR CASE AND GEAR.
APPLICATION FILED AUG. 15, 1904.
NO MODEL. 2 SHEETS—SHEET 1.

Witnesses.
Jos. J. Hosler.
J. A. Jeffers.

Inventor.
Leroy S. Pfouts.
by F. W. Bond
Attorney.

No. 775,311. PATENTED NOV. 22, 1904.
L. S. PFOUTS.
MOTOR CASE AND GEAR.
APPLICATION FILED AUG. 15, 1904.
NO MODEL. 2 SHEETS—SHEET 2.
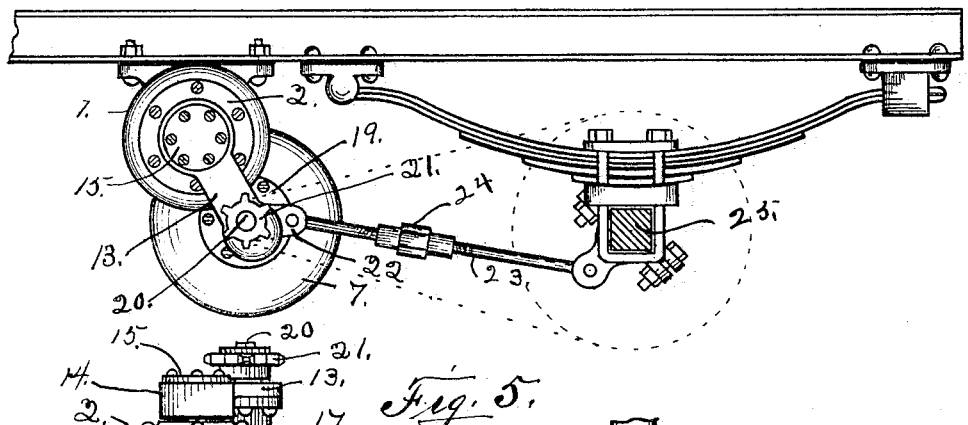
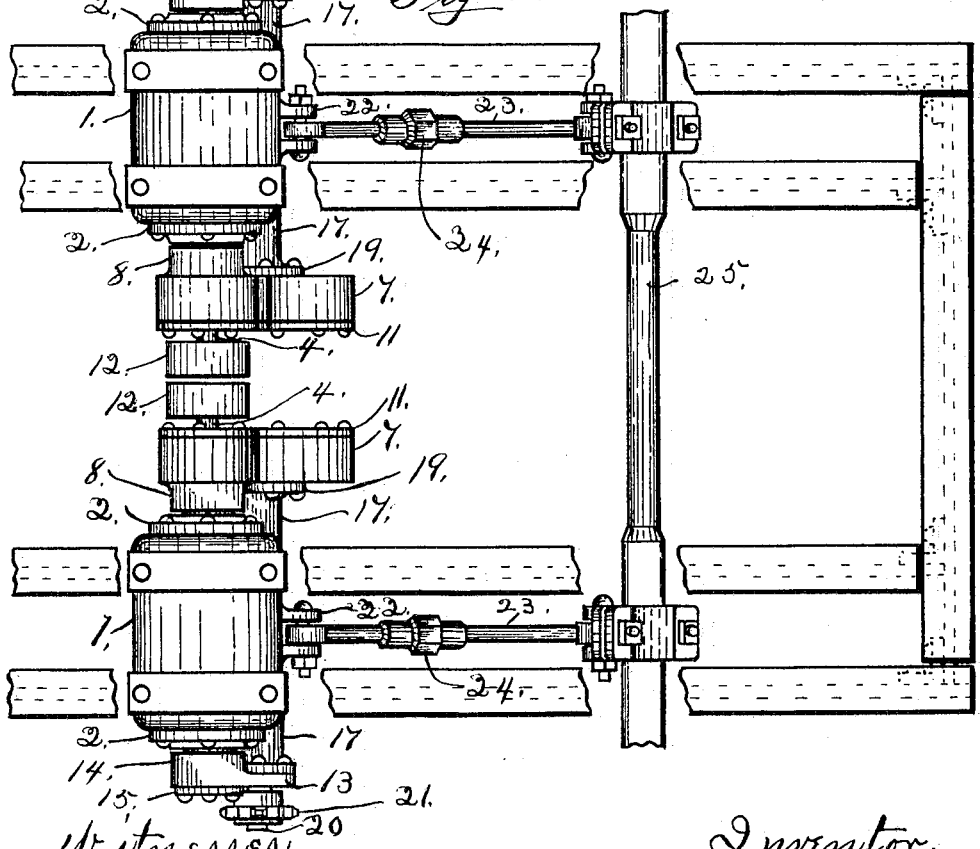

No. 775,311. Patented November 22, 1904.

UNITED STATES PATENT OFFICE.

LEROY S. PFOUTS, OF CANTON, OHIO.

MOTOR CASE AND GEAR.

SPECIFICATION forming part of Letters Patent No. 775,311, dated November 22, 1904.

Application filed August 15, 1904. Serial No. 220,768. (No model.)

*To all whom it may concern:*

Be it known that I, LEROY S. PFOUTS, a citizen of the United States, residing at Canton, in the county of Stark and State of Ohio, have invented certain new and useful Improvements in Motor Cases and Gears; and I do hereby declare that the following is a full, clear, and exact description of the same, reference being had to the annexed drawings, making a part of this specification, and to the figures of reference marked thereon, in which—

Figure 1:
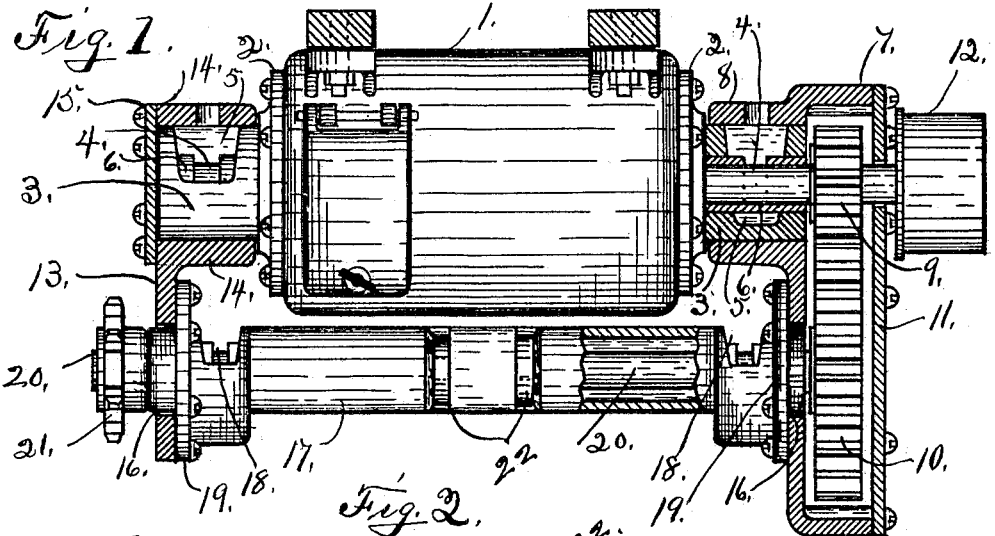
Figure 2:
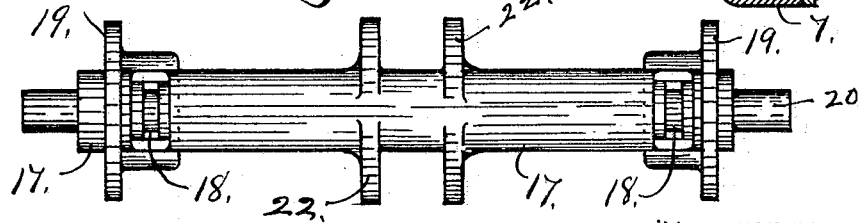
Figure 3:
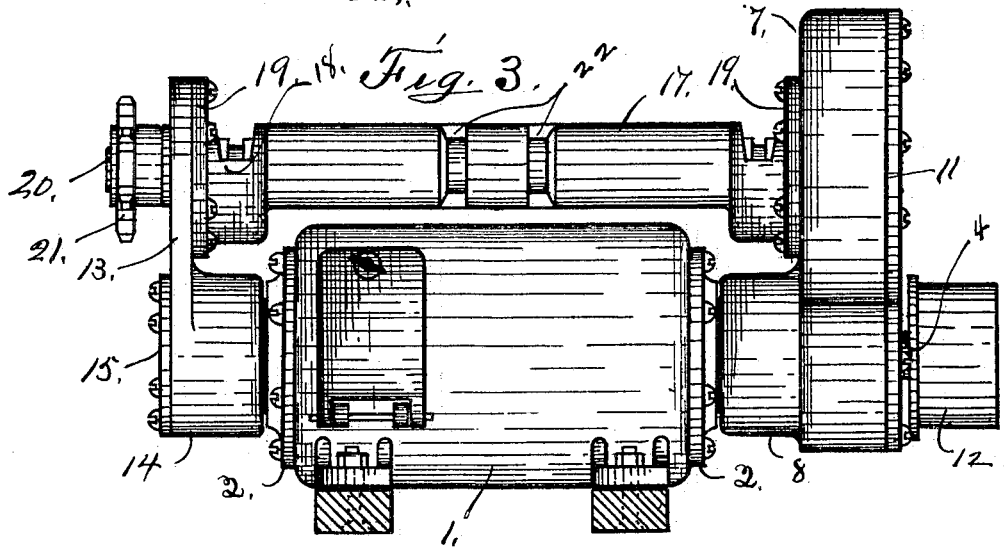

Figure 1 is a view showing the motor in side elevation, showing the same suspended, the gear-casing in section, and the counter-shaft and its casing in proper relation with the motor. Fig. 2 is a detached view of the counter-shaft casing and its attachments and the shaft located therein. Fig. 3 is a side elevation of the motor and counter-shaft casing, showing the motor supported. Fig. 4 is a view showing the motor and its different attachments applied to a vehicle. Fig. 5 is a top view showing a vehicle-frame and illustrating two independent motors and their gear-cases.

The object of the present invention is to provide a motor casing and gear applicable for general use and to so arrange the different parts that the motor proper can be suspended or supported, as desired, and whether suspended or supported it is at all times held in fixed relative position regardless of any change of distance necessary for changing or adjusting the distance between the driving gear-wheel and the driven wheel or object.

Similar numerals of reference indicate corresponding parts in all the figures of the drawings.

In the accompanying drawings, 1 represents the motor-casing, which is constructed as hereinafter more particularly described. To the ends of the motor-casing 1 are attached the plates 2, which plates are provided with the integral armature-bearings 3, which bearings are formed of sufficient length and diameter to properly carry the armature-shaft 4, said bearings being provided with the oil-pockets 5. For the purpose of providing suitable bearings the usual bushings 6 are provided and are located substantially as shown in Fig. 1.

The gear-casing 7 is provided with the hollow flange 8, which hollow flange is located upon the armature-shaft bearing 3 and concentrically with said bearing and armature-shaft. Within the casing 7 and upon the armature-shaft 4 is located the armature-pinion 9, which armature-pinion meshes with the gear-wheel 10, said gear-wheel being located in the casing 7. Upon the outer end of the casing 7 is properly attached the cap or plate 11, and through said cap or plate is extended the armature-shaft 4 in order to provide means for properly attaching the brake-wheel 12. Upon the opposite bearing 3 from that to which the casing 7 is mounted is mounted the arm 13, which arm is provided with the hollow flange 14, said hollow flange being located concentrically with the bearing 3 and the armature-shaft 4. For properly closing the outer end of the hollow flange 14 the cap or plate 15 is provided.

The lower portions of the casing 7 and arm 13 are each provided with suitable apertures 16, which apertures receive the ends of the counter-shaft casing 17, as illustrated in Fig. 1. The ends of the counter-shaft casing 17 are each provided with the bearings 18, which are formed in substantially the same way as the bearings for the armature-shaft 4, and hence will need no detailed description. Near the ends of the counter-shaft casing 17 are located the connecting-flanges 19, which connecting-flanges are securely attached to the arm 13 and to the casing 7, respectively, and upon the inner faces of said parts, by which arrangement the casing 7 and the arm 13 are held in proper space relation and in proper relative position. Within the counter-shaft casing 17 is located the counter-shaft 20, upon which counter-shaft is mounted the gear-wheel 10 and the gear sprocket-wheel 21. The counter-shaft casing 17 is provided with the spaced flanges 22, which flanges extend in either direction from the counter-shaft casing, substantially as shown in Fig. 2.

When it is desired to suspend the motor—as, for instance, in attaching the same in a vehicle-frame—the counter-shaft and its casing are located below the motor, as illustrated in Fig. 1, and when it is desired to support the motor the counter-shaft and its casing are located above the motor, as illustrated in Fig. 3. However, it will be understood that the counter-shaft and its casing may be located at any point of the circle desired by rotating the casing, and the arm 13 around the bearings 3, thereby providing simple and easy means for locating and properly connecting a motor for any desired purpose with a propelling-vehicle or in driving stationary machines. It will, however, be understood that in changing the counter-shaft casing 17, together with the different parts carried thereby, from a point below the motor said counter-shaft casing must be detached and turned so as to keep the oil-cups uppermost, so that the oil will find its way by gravity to properly lubricate the counter-shaft regardless of its position with reference to the motor. Another object and purpose of locating the arm 13 and the casing 7 concentrically upon the armature-bearings 3 is to provide a means for swinging said arm and casing so as to adjust the distance between the gear or sprocket wheel 21 and the gear or sprocket wheel driven without changing the position of the motor, and at the same time keeping the motor pinion and gear 10 in poper mesh under all circumstances regardless of the adjustment of the counter-shaft and its casing.

For the purpose of holding the counter-shaft 17, together with the parts carried thereby, in fixed adjustments, the adjustable tie-rod 23 is provided, which tie-rod is provided with the coupler 24. In Fig. 4 I have shown the tie-rod connected to the counter-shaft casing and to the axle 25 of a vehicle; but this is simply conventional in order to show or illustrate the purpose of said tie-rod. It will be understood that the ends of the tie-rod may be attached in many ways without departing from the nature of the present invention.

In Fig. 5 I have illustrated two motors located in axial alinement, which motors are independent and of the same general construction as the single motor-casing above described and their counter-shaft casings attached in the same manner as above described. In said Fig. 5 I have also shown the tie-rods 23 properly connected to the axle 25.

It will be understood that in changing from suspension to support the cap 2, carrying the integral bearings 3, should be detached and turned, so as to bring the oil-pocket uppermost.

Having fully described my invention, what I claim as new and desire to secure by Letters Patent, is—

1. In a motor case and gear, a motor-casing the end members thereof provided with armature-shaft bearings, a gear-casing mounted upon one of said bearings, an arm mounted upon the other bearing, a counter-shaft casing located between the gear-casing and arm and secured thereto, said counter-shaft casing provided with bearings, a shaft located through said casing and its extended end provided with a driving-wheel, and a gear-wheel located upon the opposite end of said shaft, an armature-shaft provided with a pinion, said pinion meshing with the gear-wheel mounted upon the counter-shaft, substantially as and for the purpose specified.

2. The combination of a motor-casing, armature-bearings located at the ends of said motor-casing, a counter-shaft casing and counter-shaft detachably connected to members concentrically mounted upon the motor-casing, an armature-shaft having mounted thereon a pinion, a gear-wheel mounted upon the counter-shaft and meshing with said pinion, and the counter-shaft-casing-holding members, and counter-shaft casing all concentrically located around the armature-shaft, substantially as and for the purpose specified.

3. In a motor case and gear, the combination of a motor-casing, armature-bearings, and an armature-shaft located therein, swinging members mounted upon the armature-bearings, a counter-shaft casing located between the swinging members and secured thereto, said casing adapted to be attached to the swinging members in reversed position, and means for imparting rotary motion to the counter-shaft, substantially as and for the purpose specified.

4. In a motor case and gear, the combination of a motor-casing, armature-bearings, and an armature-shaft located therein, swinging members mounted upon the armature-bearings, a counter-shaft casing located between the swinging members and secured thereto, said casing adapted to be attached to the swinging members in reversed position, and means for imparting rotary motion to the counter-shaft, and means for holding the counter-shaft casing and counter-shaft in fixed adjustment, substantially as and for the purpose specified.

In testimony that I claim the above I have hereunto subscribed my name in the presence of two witnesses.

LEROY S. PFOUTS.

Witnesses:
F. N. BOND,
A. M. McCARTY.